United States Patent [19]

Ferraro

[11] 4,276,738
[45] Jul. 7, 1981

[54] HOP PICKING MACHINE

[75] Inventor: Dominick Ferraro, Walla Walla, Wash.

[73] Assignee: Chisholm-Ryder Co., Inc., Niagara Falls, N.Y.

[21] Appl. No.: 145,868

[22] Filed: May 1, 1980

[51] Int. Cl.³ ............................................. A01D 46/02
[52] U.S. Cl. .......................................... 56/130; 56/330
[58] Field of Search ................................... 56/126–130, 56/330, 27.5, 33–35

[56] References Cited
U.S. PATENT DOCUMENTS

| 2,447,122 | 8/1948 | Horst, Jr. | 56/130 |
| 3,594,995 | 7/1971 | Soules | 56/130 |

Primary Examiner—Jay N. Eskovitz
Attorney, Agent, or Firm—Wells, St. John & Roberts

[57] ABSTRACT

A picking machine is described for harvesting hops from vines that have been trained over a low profile trellis. The machine includes two sets of vertical picking conveyors that straddle the vines. The conveyor sets are transversely adjustable toward or away from the vine. A forward picking conveyor set includes picking fingers that move continuously downwardly, stripping hops down from opposite sides of the vine downwardly onto horizontal receiving conveyors. A rearward set of picking conveyors follow the forward set with picking fingers moving upwardly. The upwardly moving picking fingers lift the vine, "stringing" the vine vertically and stripping the remaining hops so they will fall downwardly onto receiving conveyors below.

7 Claims, 3 Drawing Figures

HOP PICKING MACHINE

BACKGROUND OF THE INVENTION

The present invention relates to machines for automatically picking hops from hop vines.

Hops are leafy knotted flowers that grow on vines. Hop vines can grow to a substantial height and will train themselves over any upright support. Commercial growing of hops, therefore, takes advantage of the climbing capability of the vines by allowing the vines to grow up trellises in low rows. The unusual height of the hop vine led, in the past, to a harvest technique of simply cutting the vine at its base and pulling it downwardly off the trellis to gain access to the hops along the full length of the vines. Leaving the vine intact on the trellis, however, is known to favorably affect the yield of the following years crop. Therefore, attempts have been made to produce hop picking machines that will automatically harvest hops from vines still remaining on the trellis.

U.S. Pat. No. 2,447,122 granted to Horst, Jr. et al in 1948 discloses a machine that will move along a row of hop vines to strip hops from the vines. The Horst machine, however, provides a roller that moves along the ground surface, engages the lines at the base, and pulls them downwardly through hop picking fingers. The vines are pulled downwardly and smashed against the ground by the heavy roller. As the vines move downwardly, upwardly moving fingers are used to strip the hops as the vines are pulled downwardly. The hops fall onto a skirting and roll onto substantially horizontal hop collecting conveyors.

There has been recent interest in attempting to harvest hops from vines grown on low profile trellises rather than the tall, traditional hop trellis. A machine developed through conversion of a grape harvesting machine for this purpose included paired, opposed upright hop picking conveyors with outwardly protruding picking fingers. The machine would be driven over the trellis and vine with the picking conveyors situated on opposite sides of the vine. The inwardly facing flights were powered to move the picking fingers continuously upward, lifting the leaves and vines upwardly and stripping the hops from the vines. Such apparatus had many disadvantages. The long hop vines would often wrap over the top of the picking conveyors and the entire hop plant could be forceably uprooted, causing serious harm to the following year's crop. The problem remained, then, of providing an automatic hop picking machine that could effectively clean hops from the hop vines entrained on low profile trellises without doing substantial damage to the vine structure or the trellis.

The present invention is a hop picking machine that enables picking of hops entrained on low profile trellis hop vines without injuring the vine structure or the trellis. The present picking machine includes two sets of picking conveyors. A first longitudinal set of fingers on the first picking conveyor engages the opposite sides of the hop plants and pulls downwardly, stripping hops from the vines in a downward motion. A second set of conveyors follows the first set with upwardly moving fingers. The upwardly moving fingers move along paths that extend above the top of the trellis so the full length of the hop vine can be vertically "strung out" while the hops are being removed therefrom. The vines thus are not capable of wrapping over the top of the picking conveyors and so cannot become entangled and uprooted between the working flights.

BRIEF DESCRIPTION OF THE DRAWINGS

A preferred embodiment of the present invention is illustrated in the accompanying drawings in which.

DETAILED DESCRIPTION OF A PREFERRED EMBODIMENT

Figure 2:
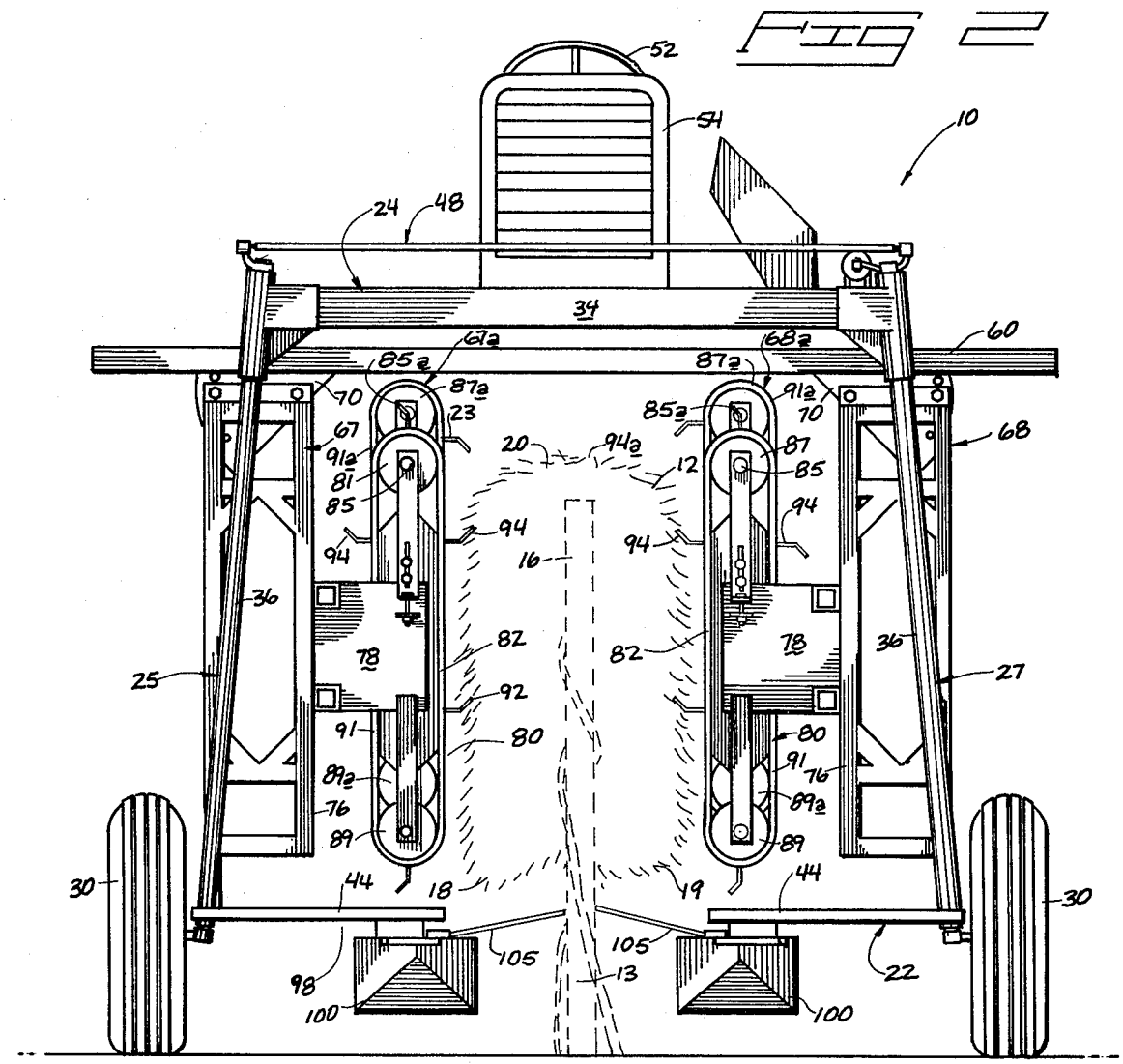
FIG. 2 is a front elevation view of the machine illustrated in FIG. 1.

The present hop picking machine is generally designated in the drawings with the reference numeral 10. The present machine 10 is specifically designed for the picking of hops from hop vines 12 (FIG. 2). The hops grow and entrain themselves on a low profile trellis 16 along a row. The height of trellis 16 resembles that of a grape trellis and is substantially lower than the standard top trellis. The foliage of the hop vines is supported on the trellis 16 and includes row sides 18 and 19 that extend upward to the trellis top 20.

It is not unusual for hop vines to grow over the top of relatively low trellises 16. As this happens, the vines have nothing above the trellis top to cling to. They therefore start growing back down the opposite side of the trellis, clinging to part of the vine that previously grew up the opposite side. The actual length of the vine may therefore be substantially greater than the apparent height of the vine on the trellis.

The present hop picking machine 10 includes an inverted U-shaped frame 22. Frame 22 defines an open longitudinal passage 23 that extends through the frame from front to rear. The frame is intended to straddle a row of hops as they grow on trellis 16.

The mobile frame 22 includes an overhead frame structure 24 that extends elevationally over the hop line row to clear the top 20 and to clear a vine that has been "strung out" or stretched to its maximum length above the ground surface. The overhead frame structure 24 is therefore spaced substantially above the apparent top elevation of the vines.

The mobile frame 22 includes side frame structures 25 and 27. The structures 25 and 27 extend downwardly from the overhead frame structure 24. The side frame structures 25 and 27 straddle the support trellis 16.

Wheel assemblies are provided at lower extremities of the side frame structures 25 and 27. They enable the mobile frame 22 to be propelled along the row, parallel to the line represented by the trellis and hop vines growing thereon. The overall wheel assembly includes a pair of front steerable wheels 30 that are selectively turned about vertical axes. The front steerable wheels enable the hop picking machine to be guided in a desired direction, providing alignment of the picking machine 10 with respect to the hop row. The wheel assembly also includes rearward drive wheels 32 that are situated adjacent the rear of the frame 22. The drive wheels 32 are driven through appropriate driving mechanisms to propel the vehicle along the hop vine row.

Transverse beams 34 (FIG. 2) are provided on the overhead frame structure 24. The beams 34 extend transverse to the longitudinal direction of the machine 10. Longitudinal beams 35 (FIG. 1) extend in the longitudinal direction. Together, the beams 35 and 34 form a rectangular support structure upon which various driving and control components are situated.

The side frame structures 25 and 27 extend downwardly from the overhead frame structure 24, each including front leg elements 36 and rear leg elements 38. The legs 36 and 38 extend downward from opposed ends of the overhead frame structure to the front steerable wheels 30 and the rear drive wheels 32 respectively. The side frames 25 and 27 include bottom side frame beams 42 (FIG. 1) that extend longitudinally to interconnect the front leg elements 36 and the rear leg elements 38.

The mobile frame 22 also includes a front deflector guide 44 for each side frame structure 25 and 27 (FIG. 2). The guides 44 extend from the front frame leg elements 36 in and rearwardly toward the center of the frame. The guides 44 serve to deflect any foliage from the front of the vehicle inwardly toward the center of the vehicle to pass through the longitudinal passageway 23.

The present machine 10 includes a steering mechanism 48 that is operatively connected to the front steerable wheels 30. The mechanism 48 enables selective turning of the wheels 30. Mechanism 48 is positioned on the overhead frame structure 24 and is interconnected between the front steerable wheels 30 so the wheels 30 may be turned in unison.

The present machine 10 also includes an operator station 50 (FIG. 3) that is located on the overhead frame structure 24. A steering control means 52 is located at the operator's station 50. The steering control means 52 is operatively connected to the steering mechanism 48 for turning wheels 30 in response to operation by the drive of the machine. The steering control means 52 includes a typical steering wheel that may be easily handled by the operator at an operator station 50. The station 50 is situated at the top of the machine to afford greatest visibility for the operator as he controls the machine to move along successive rows of the hop plants.

Adjacent the operator station is an engine 54 used for driving the machine along the ground surface. The engine 54 is operatively connected to the rear driving wheels by conventional drive mechanisms (not shown). The engine 10 may perform the additional function of driving a hydraulic pump 57 that can be used for operating other systems of the machine. The engine 54 may be mounted on the overhead frame structure 24 forward of the operating station 50 and overlying the trellis. Alternately, the engine can be situated along the outward side of either side frame structure 25 or 27.

The overhead frame structure 24 further includes a first pair of transverse carriage rails 60 and 61 that extend substantially perpendicular to the intended direction of travel of the machine adjacent the forward portion of the structure 24. A first pair of picking carriages 67 and 68 are movably mounted to the transverse carriage rail 60 and 61 respectively. The rails 60 and 61 enable picking carriages 67 and 68 to move transversely inward or outward with respect to each other to vary the gap or distance between them.

Each picking carriage 67 or 68 includes a carriage bed 70 that has rollers 71 mounted thereon for rolling on the carriage rail 60 and 61. Each of the carriage beds 70 is attached to a cylinder assembly 72 that functions as an adjustment means for enabling the carriages to be adjustably moved in a transverse direction along the carriage rails 60 and 61. The selected transverse distance between the picking carriages 67 and 68 is determined with respect to the fullness of the hop vine. The effective distance between the carriages 67 and 68 can be selectively changed by appropriate controls situated at the operator's station. Such controls will selectively vary the flow of hydraulic fluid to the cylinder assembly 72, affecting their extension or retraction and simultaneously adjusting the lateral distance between the carriages 67 and 68.

Each of the carriages 67 and 68 include side frames 76 (FIG. 2) that extend downward from the carriage bed 70. The side frames 76 each include conveyor brackets 78 (FIG. 1) that may extend inward from the side frames to support elongated vertical picking conveyors 80. Each of the picking conveyors 80 is vertically oriented to provide an inner picking flight 82. The bottom ends of the vertically oriented conveyors 80 is situated to be adjacent the bottom foliage of the hop plants. The top of the upright conveyors 80 is elevationally adjacent to the apparent top 20 of the vine when growing over the trellis 16.

Figure 1:
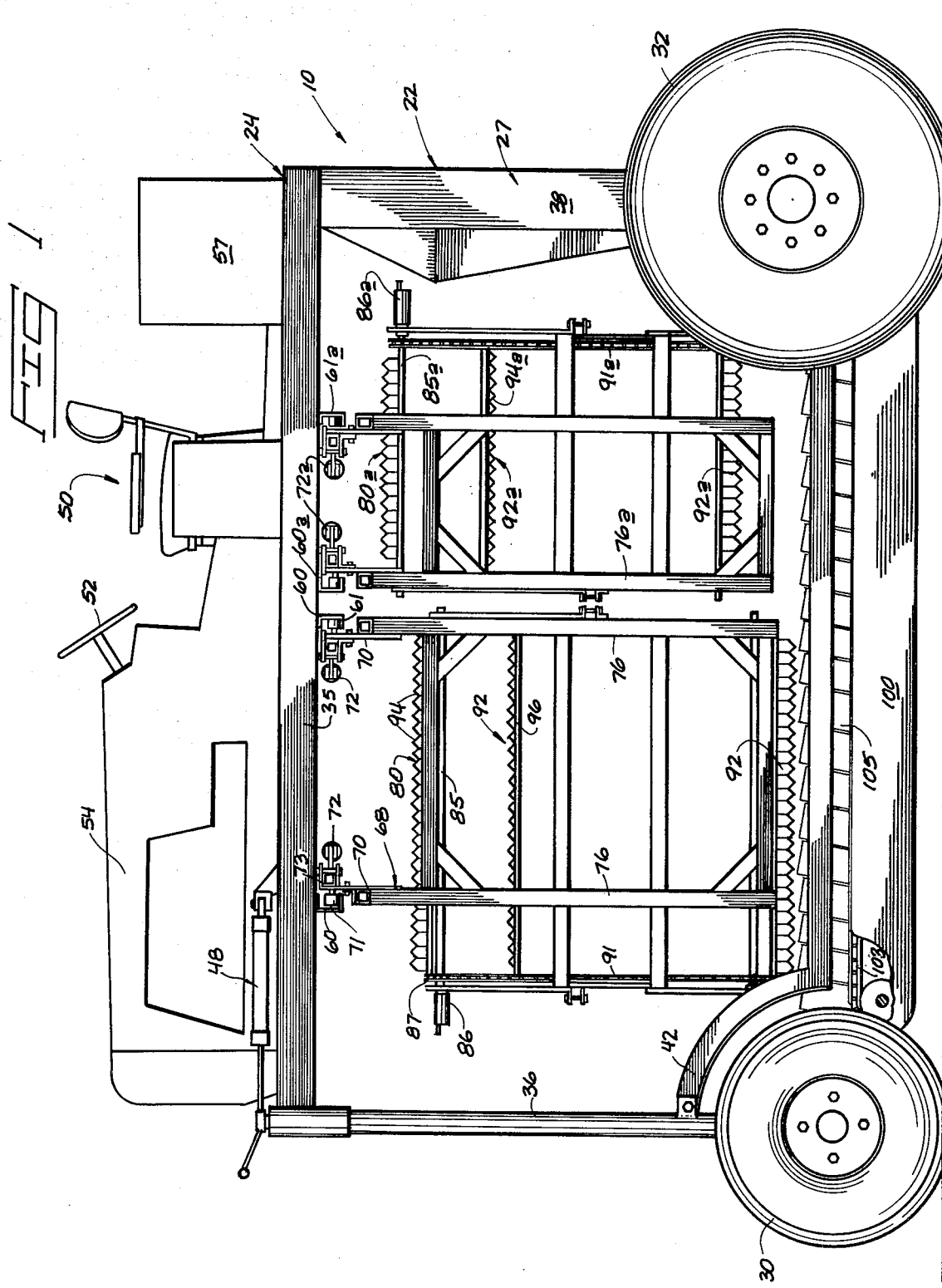
FIG. 1 is a side elevation view of a hop picking machine embodying the principal features of the present invention.
Figure 3:
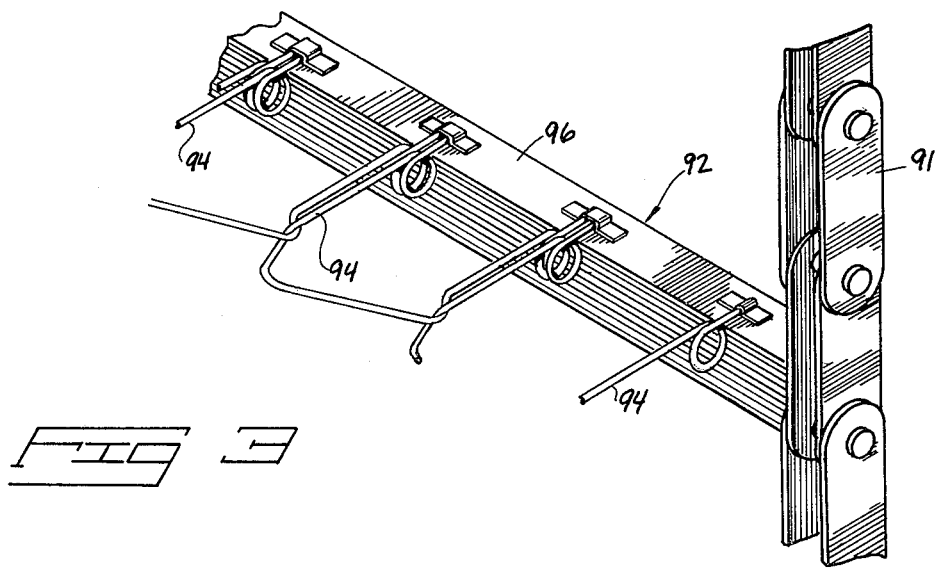
FIG. 3 is an isometric fragmentary view of a picking finger assembly used by the present machine.

Each of the picking conveyors 80 includes a drive shaft 85, having chain drive sprockets 87 mounted thereon. Lower ends of the picking conveyors include idle sprockets 89. Sprocket chains 91 are supported between the drive sprockets 87 and idle sprockets 89. The chains 91 support finger stripping assemblies 92 (FIGS. 1 and 3). The stripping assemblies 92 are positioned at desired intervals along lengths of the chains so they will move with the chains to engage the hop vine sides 18 and 19.

Each of the finger stripping assemblies 92 have spring loaded stripping fingers 94. The fingers are best illustrated in FIG. 3 which illustrates several of the fingers extending outward from a cross tube 96. The fingers 94 extend into the sides 18 and 19 of the hop row for engaging the foliage and stripping the hops from the vines. Hydraulic motors 86 are operatively connected to the drive shaft 85 to drive the inner picking flight 82 downwardly.

The present hop picking machine further includes a second pair of picking carriages 67a and 68a that are positioned behind the carriages 67 and 68 with respect to the forward direction of travel for the machine 10. The second carriages 67a and 68a are movably mounted to transverse carriage rails 60a and 61a. The rails 60a and 61a enable transverse movement of the carriages independently of the first carriages 67 and 68. The second carriages 67a and 68a are attached by cylinder assembly 72a across the framework. They can be operated to vary spacing between the second carriages without affecting spacing of the first carriages. Similar controls are provided for the operator adjacent his operating station to cause independent movement of the second pair of picking carriages 67a and 68a relative to similar movement of the first carriage pair. It may be preferable to locate the second pair of picking carriages 67a and 68a more closely together than are the first pair of carriages 67 and 68.

Both carriages 67a and 68a include side frames 76a that extend downwardly from roller supported carriage beds 70a. The frames 76a each include conveyor brackets that are not shown in the drawings but are substantially identical to the conveyor brackets shown in FIG. 1. A second pair of elongated picking conveyors 80a are supported on the conveyor brackets. The conveyors 80a are vertically oriented, like conveyors 80, and provide inward picking flights 82. The elevation of conveyors 80a is substantially above the first conveyors 80.

Drive sprockets 87a and drive shafts 85a are elevated from the corresponding sprockets 87 and shafts 85 of the first conveyors. The elevational positions of the drive sprockets 87a correspond with or are slightly greater than the actual height of the vines when they are "strung out" vertically to their full length above the trellis. The lower ends defined by idler sprockets 89a might be at the same elevation as the corresponding sprockets 89 of the first conveyors or may be slightly elevated therefrom as shown in FIG. 1.

The conveyor chains 91a on sprockets 87a and 89a support second sets of finger stripping assemblies 92a. The assemblies 92a are inverted in relation to the forward assemblies 92. Motors 86a are operated to drive the conveyors 80a so that the inner picking flights 82 thereof will move upwardly, with associated fingers 94a stripping the hops upwardly. The vines engaged by the fingers 94a will be drawn upwardly and any part of the vine that overlaps the top of the trellis will be drawn on upwardly by the fingers 94a and stretched to their actual height.

Longitudinal, substantially horizontal receiving conveyors 100 are positioned below the picking conveyors 80 and 80a for receiving the stripped hops and for conveying the hops outwardly from beneath the vines. Each of the receiving conveyors has an upper horizontal flight 103 (FIG. 1) for moving in a longitudinal direction and for conveying the stripped hops to a desired location for further processing.

A deflector pan or tray 105 extends inward and upward from each of the receiving conveyors 100. The pans 105 receive falling hops and direct their downward movement onto the working upper flight 103 of the receiving conveyors 100. The deflector pans 105 may overlap each other and are biased continuously inwardly. The pans 105 will deflect upon engaging a vine or trellis post while still providing means for preventing the hops from falling onto the ground as they are stripped off the vines. Deflector pans of metal or other rigid material are shown in the drawings. However, it is well understood that rubber or other flexible material can be used effectively for the same purpose in directing falling hops onto the longitudinal conveyors 100.

The picking conveyors 80 and 80a as noted above are driven by hydraulic motors 86 and 86a. The motors 86 and 86a are operatively connected to the drive shafts 85 and 85a respectively. Motors 86 and 86a are connected to the hydraulic pump 57. The horizontal conveyors are also driven by hydraulic motors (not shown) that are connected to the hydraulic pump 57. During the harvesting operation, the picking conveyors 80 and 80a are continuously operated with the inner picking flights 82 and 82a moving vertically in opposite directions and continuous motion for stripping the hops from the vines as the machine is propelled along the hop vine row.

As the machine progresses forwardly, the first picking conveyors 80 come into engagement with hop vines. The downwardly moving picking fingers 94 engage the strip hops downwardly from the vines. The fingers 94 move downwardly against the vines through a vertical distance equal to the height of the vine on the trellis. The fingers 94, because they are moving downwardly, do not become entangled with the vines nor uproot the vines.

Lateral spacing between the conveyors 80 can be adjusted from time to time to accommodate vines of different fullness or growth rate. Hops stripped from the outer surfaces on the sides of the vine rows will fall onto the deflector pans 105 and roll on downwardly onto the working flights of the receiving conveyors 100.

The width of the first hop picking conveyors is greater than the corresponding width of the second conveyors 80a so the first conveyors will perform the bulk of the picking operation with no chance of the vines being "wound" around the conveyors and uprooted. The second narrower set of conveyors 80a are provided to complete the picking operation. Here, the fingers 94a are moving upwardly, lifting the leaves combed down by the fingers 94 and picking the hops not reached by the downwardly moving fingers 94. The upwardly moving fingers 94a lift the hop vine upwardly, pulling any overlapping ends of the vines that have grown over the top of the trellis upwardly and "stringing" them out to their actual height above the ground surface. The under sides of the overgrown vine parts are therefore exposed to the upwardly moving fingers. The elevated conveyors 80a can therefore strip extra hops from the area and substantially strip the vine. This is done without uprooting the vines. The vine hops are not pulled over the top ends of the conveyors because the conveyors 80a extend above the vines. However, the continued upward pull on the vines could eventually work the roots loose. Therefore, the widths of picking conveyors 80a is substantially less than the width of conveyors 80.

Lateral adjustment between the conveyors 80a can be accomplished independently of conveyors 80 by selective operation of the cylinders 72a. Typically, the rearward conveyors will be spaced closer together than the first, forward conveyors, since the forward conveyors will have substantially thinned the vines. The two cooperating pairs of conveyors substantially funnel the vines inwardly during the picking operation, "stringing" the vines upwardly to their full height and subsequently allowing them to fall back down over the trellis intact, without significant damage being done to the vine structure.

It should be noted that throughout the above operation, the vines are not completely removed from the trellis nor are the vines cut before the hops are removed. Instead, the vines are simply combed free of hops, first downwardly, then upwardly into a straightened condition so they stand upright irrespective of the support ordinarily provided by the trellis.

The present machine has proved to be very effective in harvesting hops in an efficient manner, requiring considerably fewer manhours and personnel than was established with prior machines. With such a machine the cost of hop harvesting has been substantially reduced.

The above described embodiment is simply illustrative of the principals of this invention. It is understood that numerous other embodiments can be readily devised without deviating from the intended scope of the invention. Therefore, the following claims are presented to more precisely define the scope of the invention.

What is claimed is:

1. A hop picking machine for harvesting hops from a row of hop vines entrained over a low profile trellis wherein the trellis height may be less than the full straightened length of the vines, said machine comprising:

an inverted "U" shaped mobile frame having a longitudinal passageway therethrough to enable the mobile frame to straddle the trellis and move longitudinally along the row;

said frame having an overhead frame structure spaced above the ground surface a distance greater than the full straightened length of a hop vine, to extend transversely over the trellis with spaced leg frame structures that extend downward from the overhead frame structure to ground engaging wheel assemblies;

a first pair of hop picking conveyors spaced apart transversely on the frame, each having an inner vertically oriented picking flight continuously movable in a downward direction from a top elevation substantially equal to the height of the trellis on opposite sides of the row of hop vines;

a first combing finger assembly mounted on each of the first hop picking conveyors for engaging the hop vines and stripping hops downwardly from the vines as the finger assemblies move downwardly along their inner picking flights;

a second pair of hop picking conveyors spaced apart transversely on the frame and longitudinally spaced from the first pair of hop picking conveyors, each having a second inner vertically oriented picking flight continuously movable in an upward direction from a top elevation substantially equal in height to the full, straightened length of a hop vine above the top elevation of the first conveyors on opposite sides of the row of hop vines;

a second combing finger assembly mounted on each of the second hop picking conveyors for engaging the hop vines and stripping hops upwardly from the vines as the second finger assemblies move upwardly along their inner picking flights, and for lifting and straightening the hop vines upwardly to their full length over the trellis;

transversely spaced longitudinal receiving conveyors on the frame below the first and second pairs of hop picking conveyors for receiving the hops stripped from the vines; and drive means operatively connected to the first and second hop picking conveyors, the receiving conveyors, and the wheel assemblies for (a) moving the mobile frame along a row; (b) moving the first and second combing finger assemblies with their respective picking flights to move in opposite directions and strip hops from the vines; and (c) operating the receiving conveyors to remove the stripped hops from below the picking conveyors.

2. The hop picking machine as defined in claim 1 wherein the overhead frame structure includes:

spaced overhead carriage rails that extend transverse to the longitudinal direction of travel;

opposing first and second picking carriages mounted on the overhead carriage rails and extending downward from the overhead carriage rails along opposite sides of the trellis;

wherein the first picking conveyors are mounted on first picking carriages with their inner vertically oriented picking flights facing each other and wherein the second picking conveyors are mounted to the second picking carriages with their picking flights facing each other.

3. The hop picking machine as defined in claim 2 wherein each picking carriage is adjustably movable on the overhead carriage rail with adjustment means for enabling the transverse distance between the inner flights of the picking conveyors to be adjusted.

4. The hop picking machine as defined in claim 1 wherein the first pair of hop picking conveyors extend longitudinally along the mobile frame a first distance and the second pair of hop picking conveyors extend longitudinally along the mobile frame a second distance less than the first distance.

5. The hop picking machine as defined in claim 4 wherein the overhead frame structure includes:

spaced overhead carriage rails that extend transverse to the longitudinal direction of travel;

opposing first and second picking carriages mounted on the overhead carriage rails and extending downward from the overhead carriage rails along opposite sides of the trellis;

wherein the first picking conveyors are mounted on first picking carriages with their inner vertically oriented picking flights facing each other and wherein the second picking conveyors are mounted to the second picking carriages with their picking flights facing each other.

6. The top picking machine as defined in claim 5 wherein each picking carriage is adjustably movable on the overhead carriage rail with adjustment means for enabling the transverse distance between the inner flights of the picking conveyors to be adjusted.

7. The hop picking machine as defined by claim 6 wherein the adjustment means is comprised of a cylinder for each pair of picking carriages, oriented transversely and interconnecting an associated picking carriage with the mobile frame so selective extension and retraction of the cylinders will cause corresponding transverse movement of the picking conveyors.

* * * * *